United States Patent [19]

Endo et al.

[11] Patent Number: 5,709,507
[45] Date of Patent: Jan. 20, 1998

[54] PNEUMATIC BAR CONVEYING APPARATUS

[75] Inventors: Isao Endo, Chiba-ken; Kunihiro Konishi, Ibaraki-ken, both of Japan

[73] Assignee: Tokyo Automatic Machinery Works, Ltd, Tokyo, Japan

[21] Appl. No.: 577,471

[22] Filed: Dec. 22, 1995

[51] Int. Cl.⁶ .................................................. B65G 51/02
[52] U.S. Cl. ................................................. 406/67; 406/68
[58] Field of Search .................................... 406/68, 67, 19

[56] References Cited

U.S. PATENT DOCUMENTS

| | | | |
|---|---|---|---|
| 3,386,774 | 6/1968 | Strydom | 406/68 |
| 3,535,003 | 10/1970 | Rudszinat et al. | 406/67 |
| 3,827,757 | 8/1974 | Heitmann et al. | |
| 4,740,113 | 4/1988 | Hirose et al. | |
| 5,536,118 | 7/1996 | Schimidt et al. | 406/68 |

FOREIGN PATENT DOCUMENTS

| | | |
|---|---|---|
| 0262236 | 9/1986 | European Pat. Off. |
| 0635220 | 7/1994 | European Pat. Off. |
| 0640296 | 8/1994 | European Pat. Off. |
| 1131149 | 2/1957 | France ........ 406/67 |
| 54-34233 | 10/1979 | Japan. |
| 62-19522 | 5/1987 | Japan. |
| 678003 | 8/1979 | Russian Federation ........ 406/68 |
| 701901 | 12/1979 | Russian Federation ........ 406/67 |

*Primary Examiner*—Gary C. Hoge
*Attorney, Agent, or Firm*—Greenblum & Bernstein P.L.C.

[57] ABSTRACT

A pneumatic bar conveying apparatus in which compressed air is supplied from an air injection port towards a bar-like material in each of a plurality of holding grooves is intermittently supplied by an intermittent air supply mechanism, so that the compressed air will be shut off by a tooth-shaped section protrudingly provided between the holding grooves for a longer period than an air shut-off period. After a specific period of compressed air supply into the holding groove, the supply of the compressed air is shut off to decrease the outlet pressure of the compressed air remaining in the holding groove and the conveying pipeline, resulting in an increased pressure difference as compared with the inlet pressure of the compressed air supplied into the holding groove from the air injection port. Consequently the compressed air flows at a higher rate from the holding groove into the conveying pipeline, thus imparting a large initial flow velocity to the bar-like material in the holding groove.

10 Claims, 5 Drawing Sheets

PNEUMATIC BAR CONVEYING APPARATUS

BACKGROUND OF THE INVENTION

The present invention relates to a pneumatic bar conveying apparatus for supplying bar-like materials such as filter plugs and cigarettes to a receiving apparatus. More particularly the present invention relates to a pneumatic bar conveying apparatus in which a discharge drum is rotatably mounted below a bar-like material holding section and is provided with a plurality of holding grooves in the outer periphery into which the bar-like materials are charged from the holding section. The bar-like materials then are conveyed to the receiving apparatus from the holding grooves through a conveying pipe line by an air pressure supplied from an air injection port into each holding groove that has rotated to the force-feed position.

This type of pneumatic bar conveying apparatus for carrying a bar-like material has been disclosed in Japanese Patent Publication No. Sho 54-34233 in which a discharge drum rotating at a constant speed is axially mounted between two vertical plates; a compressed air injection port is provided in one of the vertical plates, open to communicate with an air supply source, so that the injection port will register with a material holding groove that has rotated to a position where the material will be force-fed. A cylinder head is connected to the other vertical plate, for example to a conveying pipe line such as a pipe or tube, the compressed air to be supplied to the discharge drum from the air injection port is fed almost continuously into each holding groove, though air supply is interrupted for an instant at a part of the air injection port when each tooth-shaped section projecting between the holding grooves rotates to pass the air injection port with the constant-speed rotation of the discharge drum. With this air pressure the bar-like material is force-fed from the holding groove into the conveying pipe line via the cylinder head and is reliably carried to the receiving apparatus under a specific discharge pressure required for carrying the material at the upstream end in the conveying pipe line.

However, in such a prior art pneumatic bar conveying apparatus, since the compressed air is supplied almost continuously into each holding groove with partial interruption of air supply during a period between the completion of force-feeding one bar-like material into the conveying pipe line till the force-feed of the following bar-like material, there is little difference in the compression pressure between the inlet side and the outlet side because of slight consumption. Accordingly, little air pressure drop, as seen from a comparison between the compressed air that has just been supplied from the air injection port into the holding groove and the compressed air that has moved to the upstream end in the conveying pipe line with the force-feed of the bar-like material. Under the conditions stated above, the compressed air flows at a slow rate from the holding groove into the conveying pipe line; for example, according to a result of tests conducted by the use of a bar-like material which is about 20 to 30 percent longer than a conventional bar-like material, increasing the discharge pressure of the compressed air supplied from the air injection port raises the compressed air pressure on the outlet side at the upstream end in the conveying pipe line. A difference between these compressed air pressures, however, will not increase so much, and therefore the long bar-like material will clog in either the cylinder head or the conveying pipe line. It is, therefore, necessary to lower the rotational speed of the discharge drum by about 60 percent for the purpose of force-feeding a long bar-like material exactly without clogging on the way from the holding groove into the cylinder head and in the conveying pipe line, resulting in a decreased speed of the bar-like material and accordingly an excessively lowered carrying capacity.

Furthermore, since the compressed air is applied to the end portion of each tooth-shaped section provided protrusively on the discharge drum, there compressed air turbulence occurs, thus causing a force which tends to bend the bar-like material in a direction intersecting the direction in which the bar-like material is force-fed into the holding groove. The thus bent bar-like material contacts the inner surface of the holding groove and the cylinder head, lowering the conveying speed of the bar-like material due to a contact resistance. Furthermore, since the compressed air is supplied simultaneously to two holding grooves on both sides of each tooth-shaped section, the force-feeding of bar-like materials in the holding grooves will fail to start simultaneously, thus feeding the bar-like materials at variable time intervals and accordingly blocking the movement of the materials.

It is therefore the first object of the present invention to provide a pneumatic bar conveying apparatus for force-feeding bar-like materials from the inside of a holding groove into a conveying pipe line rapidly and without clogging.

It is the second object of the present invention to provide a pneumatic bar conveying apparatus capable of starting to force-feed the bar-like materials at a constant timing while preventing occurrence of compressed air turbulence in a direction in which the bar-like material will be bent.

SUMMARY OF THE INVENTION

To accomplish the first object, the present invention provides an intermittent air supply mechanism for intermittently supplying the compressed air from an air injection port towards a bar-like material in each holding groove every time the holding groove rotates to a force-feed position by interrupting the air for a period longer than the air shut-off period when the air supply is shut off by a tooth-shaped section which is protrusively provided between the holding grooves, to thereby maintain a specific discharge pressure in the conveying pipe line necessary for carrying the bar-like material to a receiving apparatus while the air supply is shut off by the intermittent air supply means.

Furthermore, as the intermittent air supply mechanism, an intermittent operation valve can be inserted in a passage extending from the air injection port to the air supply source to operate in synchronism with the rotational speed of the discharge drum.

According to the pneumatic bar conveying apparatus of the above-described constitution, when the compressed air is supplied intermittently from the air injection port towards the bar-like material in each holding groove by the intermittent air supply mechanism every time the holding groove is moved to the force-feed position so that the air supply will be interrupted longer than an air shut-off period by the tooth-shaped section provided protrusively between the holding grooves, the compressed air will be interrupted after being supplied for a specific period of time into the holding groove. Thus, the outlet pressure of the compressed air remaining in the holding groove and in the conveying pipe line is lowered the pressure of the compressed air from the air injection port increases by the amount of the air shut off, to hold, within the conveying pipe line, a specific discharge pressure required to carry the bar-like material to the receiving apparatus. Then, an increase occurs in the pressure difference, as compared with the inlet pressure of the compressed air supplied from the air injection port to the holding groove, thereby raising the flow velocity of the compressed air from the holding groove into the conveying pipe line to provide a higher initial speed of travel of the bar-like material within the holding groove.

Thus, in the pneumatic bar conveying apparatus of the present invention bar-like materials can be force-fed without clogging from the inside of the holding groove into the conveying pipe line. Therefore, as compared with a prior art apparatus in which the compressed air is supplied continuously into each holding groove simply by partly shutting off the air supply for an instant during a period after completion of force-feeding one bar-like material into a conveying pipe line until the force-feeding of a following bar-like material, the pneumatic bar conveying apparatus of the present invention has a greater carrying capacity at an increased rotational speed of the discharge drum. Further, the bar-like material, if it is long, can be conveyed reliably without decreasing the rotational speed of the discharge drum and accordingly the carrying capacity of the pneumatic bar conveying apparatus is not decreased.

To accomplish the second object, the pneumatic bar conveying apparatus of the present invention is preferably provided with a partition wall for shutting off the compressed air supplied from the air injection port into the holding groove. The partition wall is connected with the air supply side of the discharge drum, and an intermittent air supply mechanism is provided in the partition wall of substantially having the same diameter as, or a communicating hole of smaller diameter than, the bar-like material in each holding groove.

In the pneumatic bar conveying apparatus of the above-described construction, air supply to the end position in the holding groove in which no bar-like material is present is shut off by the partition wall. Also, in this partition wall a communicating hole is provided of substantially the same diameter as, or a smaller diameter than, the bar-like material which is open to the bar-like material in each holding groove, thus supplying the compressed air successively to only one holding groove and accordingly producing a laminar flow of the compressed air only in the same direction as the axis of the bar-like material.

Thus it is possible to force-feed the bar-like material at a constant starting timing while preventing occurrence of turbulence of the compressed air which can contribute to bending the bar-like material, and without contacting the inner surface of the holding groove and the cylinder head and without decreasing the speed of movement of the bar-like material as compared with the prior art apparatus which can apply the compressed air to the end portion of each tooth-shaped section provided protrusively on the discharge drum. Furthermore, it is possible to carry the bar-like materials successively and smoothly at a constant time interval.

The above and other objects, features and advantages of the present invention will become more apparent from the following description with reference to the accompanying drawings.

DETAILED DESCRIPTION OF THE PREFERRED EMBODIMENTS

Hereinafter each preferred embodiment of a pneumatic conveying apparatus for conveying bar-like materials (or members) according to the present invention will be described with reference to the accompanying drawings.

Figure 1:
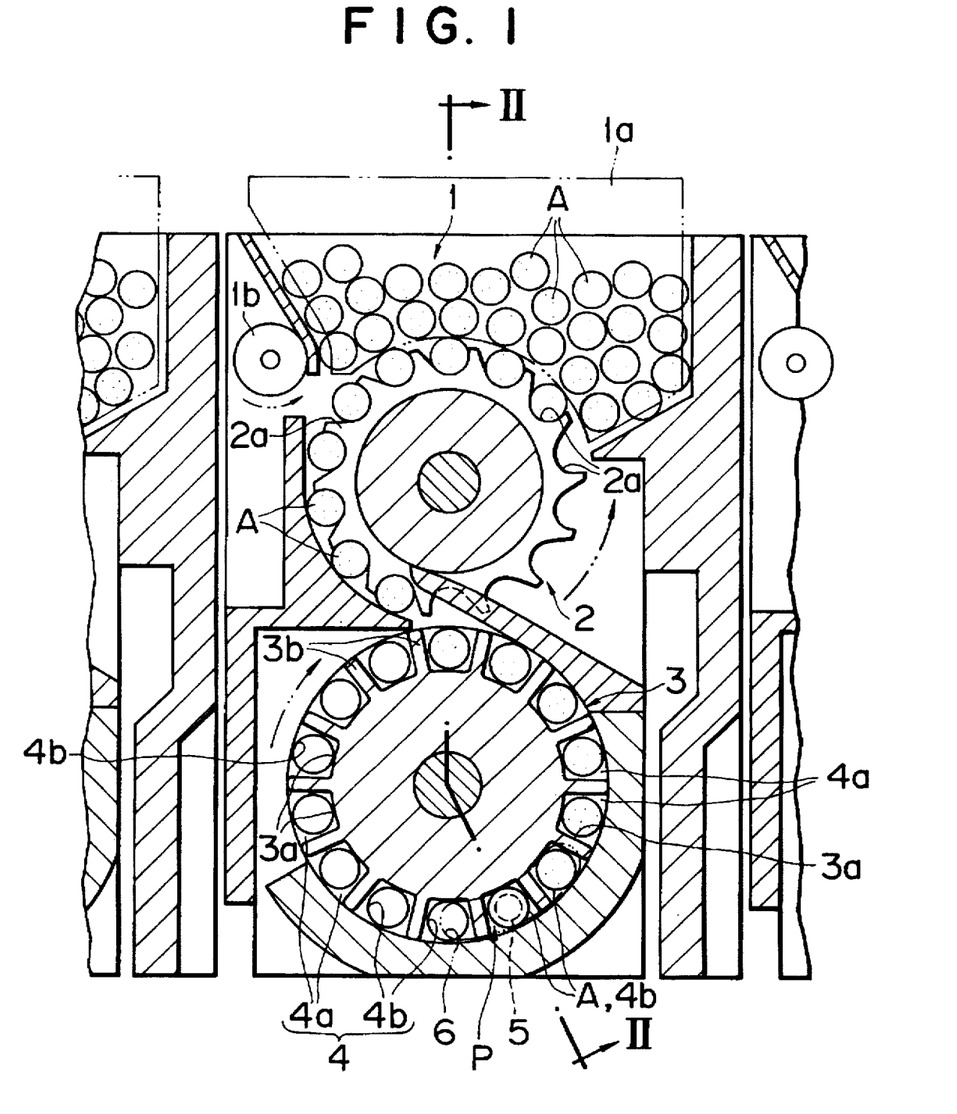
FIG. 1 is a front view in longitudinal section showing an embodiment of a pneumatic bar conveying apparatus according to the present invention.
Figure 2:
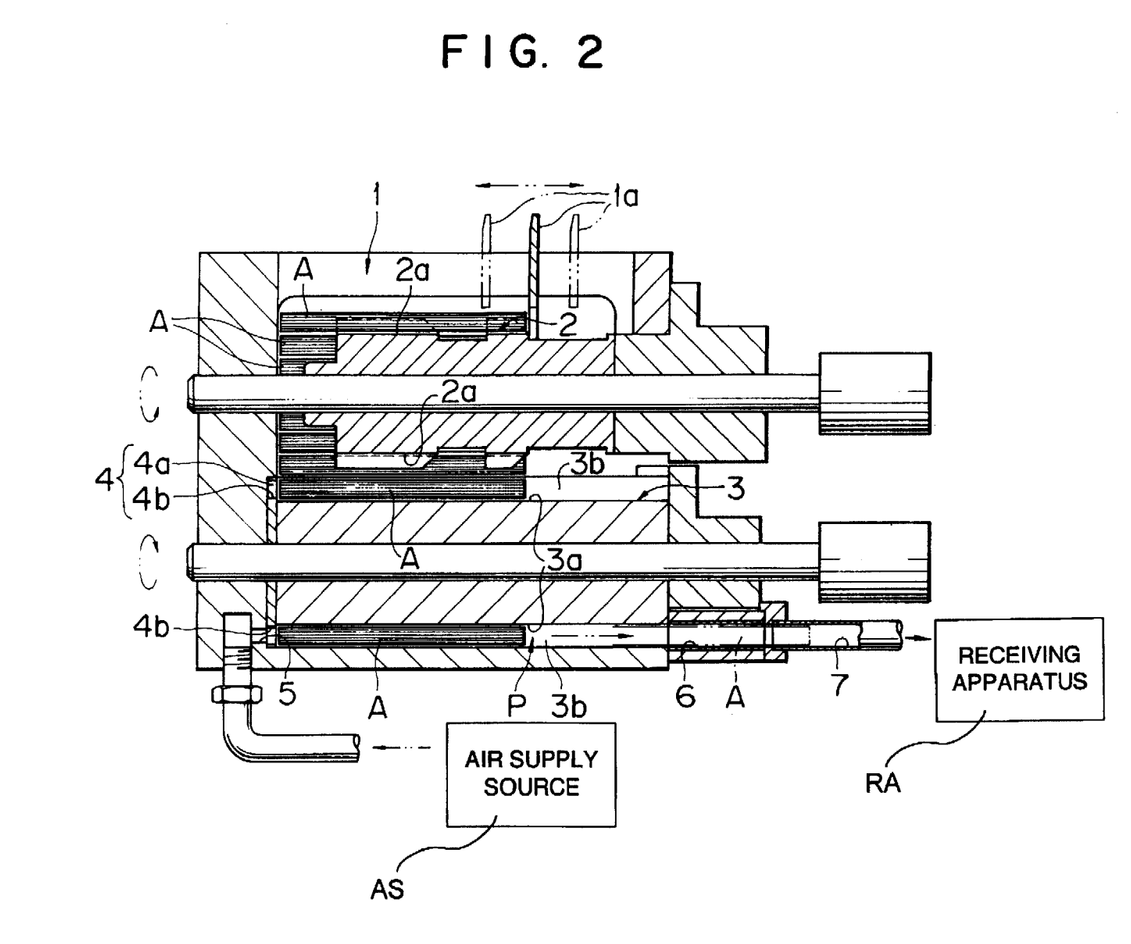
FIG. 2 is a reduced side view in longitudinal section taken along line II—II of FIG. 1.

In the present embodiment, as shown in FIGS. 1 and 2, a bar-like material A can be a filter plug. A receiving roller 2 is rotatably mounted beneath a holding section 1 such as a hopper for holding a number of bar-like materials A as disclosed in Japanese utility Model Publication No. Sho 62-19522. The bar-like materials A, after freely dropping from the holding section 1 and being oriented in a groove 2a concavely provided in the outer periphery of the receiving roller 2, are successively delivered, with the constant-speed rotation of the receiving roller 2, to holding grooves 3a of a discharge drum 3 which is rotatably disposed below the receiving roller 2. Thereafter, the discharge drum 3 rotates at a constant speed in a direction opposite to the rotation direction of the receiving roller 2, thus successively moving the bar-like materials A from the holding grooves 3a to the a force-feed position P.

The discharge drum 3 is provided with an intermittent air supply means 4 for intermittently supplying the compressed air towards the bar-like material A in each holding groove 3a for a period longer than the air shut-off period for shutting off the air supply by a tooth-shaped section 3b protrudingly provided between the holding grooves 3a every time the holding grooves 3a are rotated to the holding position P due to the constant-speed rotation of the discharge drum 3.

The intermittent air supply means 4 of the present embodiment has a partition wall 4a for shutting off the compressed air to be supplied from an air injection port 5 into each holding groove 3a. The partition wall 4a is formed as a single, projecting at the end of the compressed air injection port 5 side of the discharge drum 3, as will be described later. In the partition wall 4a are provided the same number of communicating holes 4b as the holding grooves 3a; the communicating holes 4b are of substantially the same or of a smaller diameter than, the bar-like material A, and are disposed in the same positions directed towards the bar-like material A in the holding groove 3a. More particularly, the holes 4a are open at about the center of the sectional form of the holding grooves 3a.

For example, the inside diameter of the communicating holes 4b is about 6 to 8 mm when the diameter of the filter plug which is the bar-like material A is about 8 mm. Furthermore the spacing between adjacent communicating holes 4b is larger than the inside diameter of the air injection port 5 as illustrated, so that even when the partition wall 4a stops rotating in any position, such as in the case of an emergency stoppage of the apparatus, the compressed air will flow from the inside of the holding groove 3a into a cylinder head 6 and a conveying pipe line 7 to thereby enable the smooth carrying of the bar-like material A to the receiving apparatus not shown, if the air injection port 5 and the communicating hole 4b are at least partly connected.

In the above-described force-feed position P the air injection port 5 is provided and which is able to communicate with the air supply source not shown, aligning with the holding groove 3 that has rotated at a constant speed to the force-feed position P. Also, there is provided the cylinder head 6 to which the conveying pipe line 7 such as a pipe or tube for example is connected. The air injection port 5, cylinder head 6, and conveying pipe line 7 are arranged in line with the holding groove 3a that has rotated at a constant speed to the force-feed position P. The air supply source as comprises a compressor and so forth, for example, supplying to the air injection port 5 the compressed air that has been adjusted to provide a predetermined discharge pressure. The discharge pressure is adjusted to a minimum pressure necessary for carrying the bar-like material A from the air injection port 5 into the conveying pipe line 7, or more particularly, to the receiving apparatus RA, which is at the end conveyance positions at the upstream end, even when the air supply from the air injection port to the holding grooves 3a is interrupted by the intermittent air supply means 4. This type of apparatus, however, needs a high pressure as compared with a prior art apparatus without the partition wall 4a.

The cylinder heat 6 stated above is of such a design that the inner surface of the end corresponding to the discharge drum 3 is formed in the shape of long hole extending along the direction of rotation of the holding grooves 3a and gradually contracting as it extends towards the other end to which the upstream end of the conveying pipe line 7 is connected. The downstream end of the conveying pipe line 7 is connected to the receiving apparatus, not shown.

In the figure, a reference numeral 1a denotes an adjusting plate which partitions a space inside a holding section 1 according to the length of the bar-like material, and a reference numeral 1b denotes a raising roller.

Next, operation of the pneumatic bar conveying apparatus will be explained.

First, with the constant-speed rotation of the discharge drum 3, the bar-like materials A in the holding grooves 3a are successively carried to the force-feed position P. In this case, no compressed air is supplied into the holding groove 3a so long as the air injection port 5 is closed by the partition wall 4a of the intermittent air supply means 4. Thereafter, when the communicating hole 4b opens to communicate at least partially with the air injection port 5, the supply of the compressed air starts towards the bar-like material A in the holding groove 3a.

The air shut-off period by the partition wall 4a mentioned above is much longer than an air closing period during which the holding groove 3a is closed by the tooth-shaped section 3b; thus the compressed air is supplied from the communicating hole 4b into only one holding groove 3a. The compressed air supplied into each holding groove 3a flows as a laminar air flow only along the direction of the axis of the bar-like material A held in the holding groove 3a; therefore no force will act to bend the bar-like material A in a direction intersecting with the force-feed direction of the bar-like material A. The bar-like material A, therefore, begins to be force-fed by this air pressure into the cylinder head 6 at a constant timing.

However, when the communicating hole 4b passes over the air injection port 5, the compressed air supply into the holding groove 3a is interrupted by the partition wall 4a, thereby decreasing the outlet pressure of the compressed air in the holding groove 3a, cylinder head 6, and conveying pipe line 7 and consequently increasing a pressure difference as compared with the inlet pressure of the compressed air supplied from the air injection port 5 into the holding groove 3a.

The pressure difference, therefore, will increase the flow velocity of the compressed air flowing from inside the holding groove 3a into the conveying pipe line 7, thus imparting a large initial speed to the bar-like material A, the end portion of which is quickly force-fed into the cylinder head 6, which is formed in the shape of long hole which will not give an adverse effect to the rotation of the discharge drum 3.

At this time, since a minimum discharge pressure necessary for carrying the bar-like material A to the receiving apparatus is held at the upstream end in the conveying pipe line 7, the bar-like material A moves to the receiving apparatus through the inside of the conveying pipe line 7.

Tests conducted by using the prior art apparatus which was not provided with the partition wall 4a and communicating holes 4b of the intermittent air supply means 4 had a capacity of carrying 1800 to 2200 pieces of about 8 mm-diameter by about 120 mm long filter plugs per minute at a discharge pressure of about 1.2 kg/cm$^2$, and could be increased in the carrying capacity up to about 1300 pieces per minute at the discharge pressure of about 2.8 kg/cm$^2$. However, the pneumatic bar conveying apparatus of the present invention having the partition wall 4a and communicating holes 4b of the intermittent air supply means 4 can carry about 2000 pieces of about 150 mm long filter plugs per minute at a discharge pressure of about 2.8 kg/cm$^2$.

Figure 3:
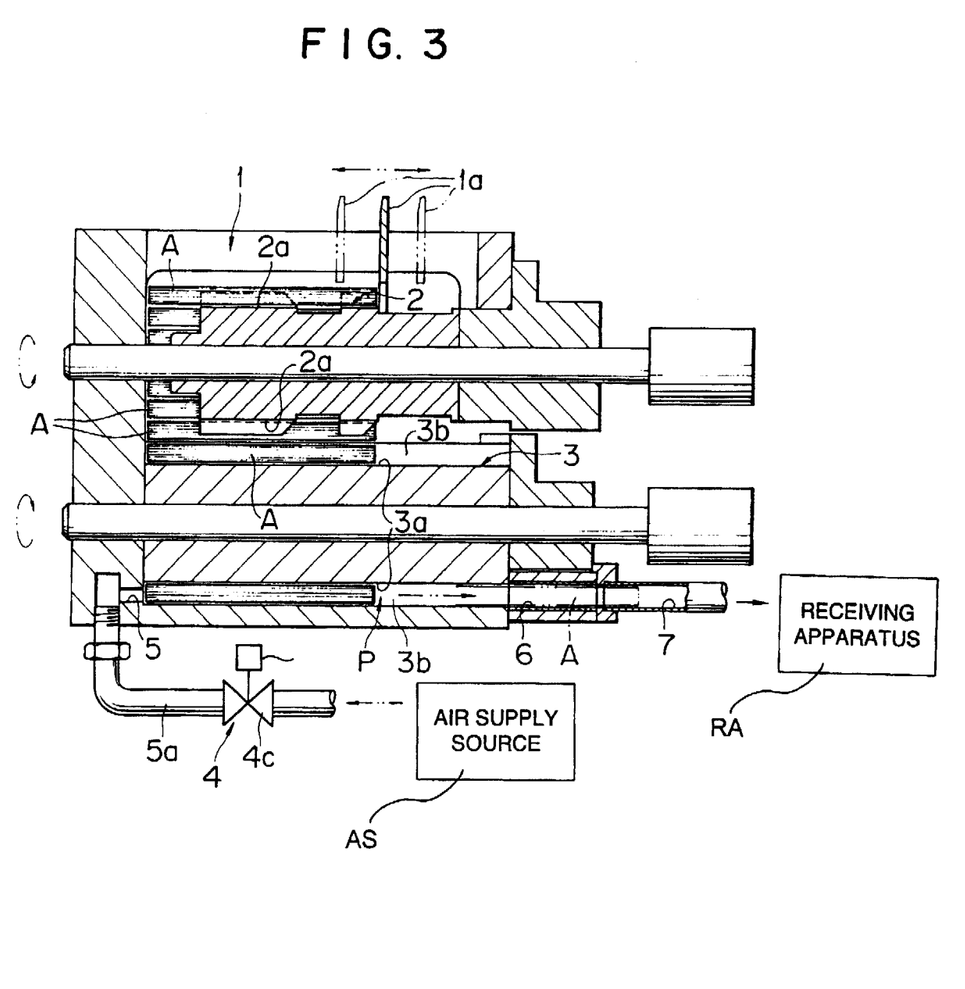
FIG. 3 is a reduced side view in longitudinal section showing another embodiment of the pneumatic bar conveying apparatus according to the present invention.
Figure 4:
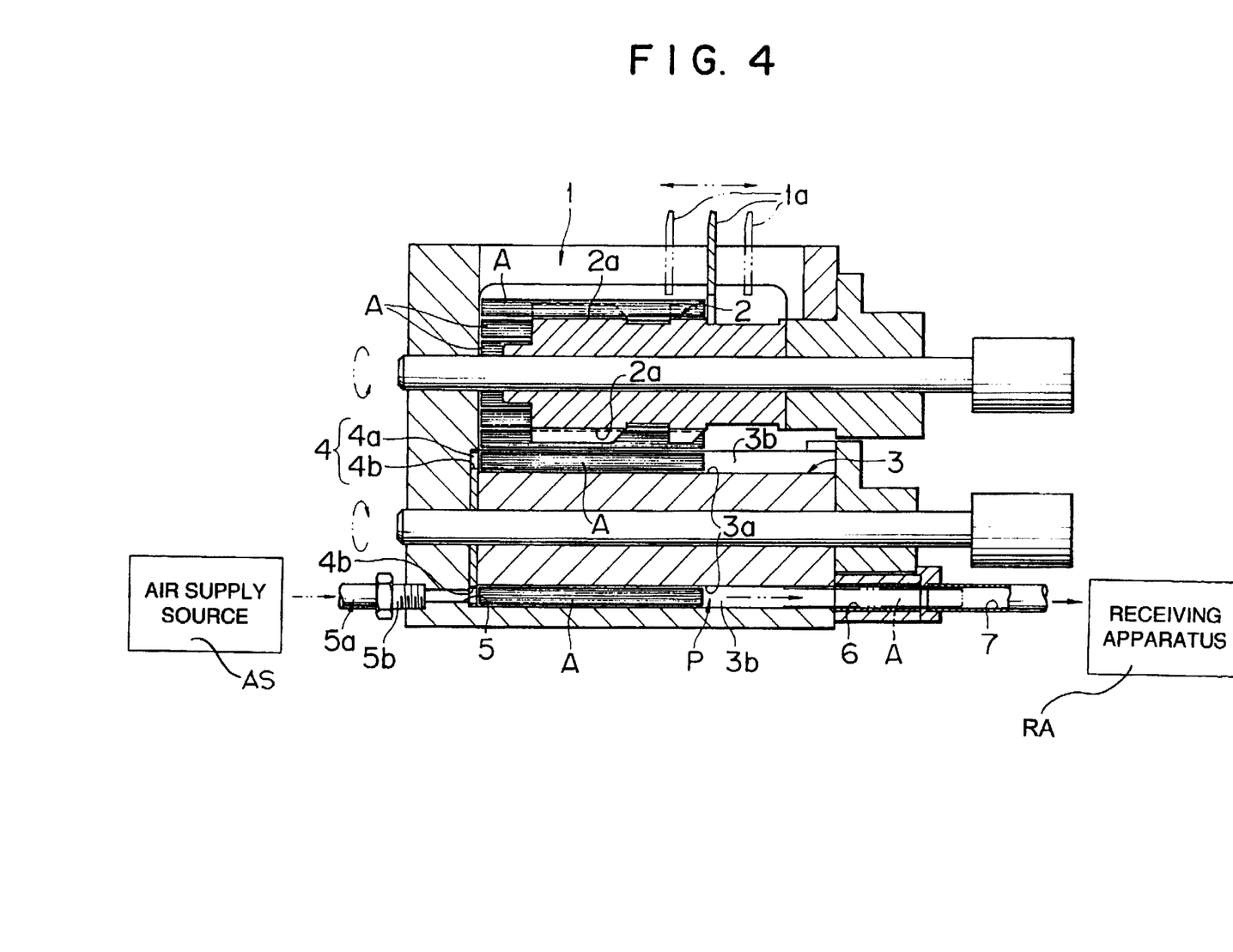
FIG. 4 is a reduced side view in longitudinal section showing still another embodiment of the pneumatic bar conveying apparatus according to the present invention.
Figure 5:
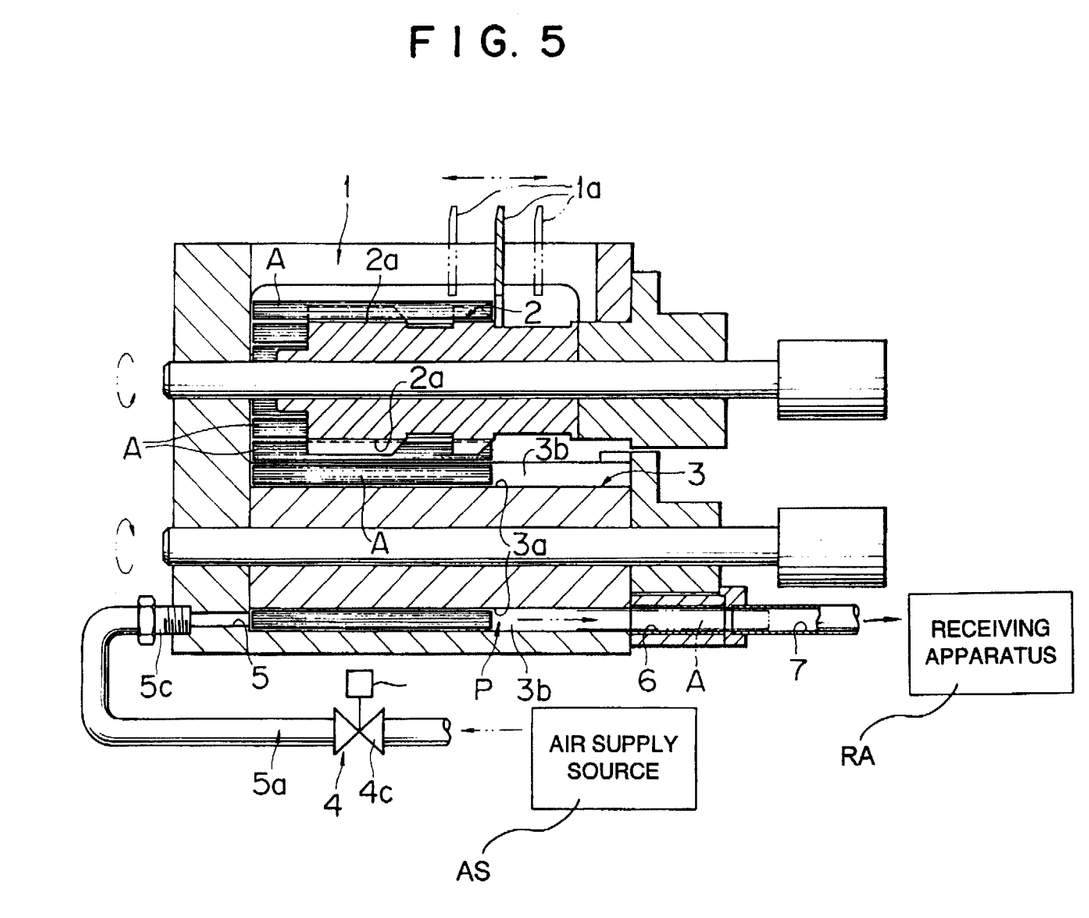
FIG. 5 is a reduced side view in longitudinal section showing still another embodiment of the pneumatic bar conveying apparatus according to the present invention.

In the meantime FIGS. 3 to 5 show other embodiments of the pneumatic bar conveying apparatus according to the present invention.

FIG. 3 shows the pneumatic bar conveying apparatus, wherein the intermittent air supply means 4 is not provided with the partition wall 4a and the communicating holes 4b as in the aforementioned embodiment, but comprises an intermittent operation valve 4c which is inserted in a passage 5a connected between the air injection port 6 and an air supply source not shown and operates in synchronization with the rotational speed of the discharge drum 3. Other constitution is basically the same as the embodiments shown in FIGS. 1 and 2.

The above-described intermittent operation valve 4c includes an electromagnetic valve for example, which changes the rotational speed of the discharge drum 3 into an electrical signal. By this electrical signal, operation control is effected to intermittently supply the compressed air from the air injection port 5 towards the bar-like material A in each holding groove 3a for a longer period than the air closing period during which the holding groove 3a is closed by the tooth-shaped section 3b protrusively provided between the holding grooves 3a.

The embodiment shown in FIG. 3 also can achieve the same operational effect as the embodiment shown in FIGS. 1 and 2.

FIG. 4 shows the constitution of the pneumatic bar conveying apparatus in which at least the end portion 5b of the passage 5a for supplying the compressed air from the air supply source, not shown, to the air injection port 5 is disposed in line with the holding groove 3a that has been moved to the force-feed position P and the axis of the bar-like material A that has been brought into the holding groove 3a. Thus, the compressed air fed from the air supply source and adjusted to a predetermined discharge pressure flows linearly, coinciding with the axis of the bar-like material A held in the holding groove 3a that has moved to the force-feed position P. The construction is the same in other regards as the embodiment shown in FIGS. 1 and 2.

FIG. 5 shows the construction of the pneumatic bar conveying apparatus that at least the end portion 5c of the passage 5a for supplying the compressed air from the air supply source, not shown, to the air injection port 5 is disposed in line with the holding groove 3a that has moved to the force-feed position P and the axis of the bar-like material A held in the holding groove 3a. Thus the compressed air that has been supplied from the air supply source and adjusted to a predetermined discharge pressure becomes a linear air flow coinciding with the axis of the bar-like material A held in the holding groove 3a that has moved to the force-feed position P. The construction is the same in other respects as the embodiment shown in FIG. 3.

In the apparatus shown in FIGS. 4 and 5, therefore, the laminar flow of compressed air is more likely to occur, flowing only in the axial direction of the bar-like material as compared with the embodiments shown in FIGS. 1, 2 and 3, thereby preventing the occurrence of compressed air turbulence in the bending direction of the bar-like material.

In each of the embodiments described above, a filter plug was used as the bar-like material A; it should be noticed, however, that the present invention is not limited thereto and is applicable to cigarettes.

Also it should be noted that the present invention is not limited to the examples of arrangement of the holding section 1 and the discharge drum 3 shown, which may be arranged as disclosed in Japanese Patent Publication No. Sho 54-34233; and furthermore the construction of the intermittent air supply means 4 is not limited to the aforesaid construction, and modifications are possible as long as they have a similar function.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope and spirit of the invention as defined by the appended claims.

What is claimed is:

1. A pneumatic bar conveying apparatus comprising:

a holding section for holding a plurality of bar-like members;

a discharge drum rotatably mounted beneath said holding section and having a plurality of holding grooves concavely formed in an outer periphery of said discharge drum, into which bar-like members are dispensed from said holding section;

an air injection port for supplying air toward an inside one of said holding grooves that has been rotated to a force-feed position;

intermittent air supply means for carrying a bar-like member from said holding groove to a receiving apparatus via a conveying pipeline by air pressure from said air injection port, and for intermittently supplying compressed air from said air injection port toward said bar-like member in each said holding groove every time said holding groove rotates to said force-feed position, then shutting off said compressed air for a first time interval;

a plurality of tooth-shaped sections protrudingly provided between adjacent ones of said holding grooves, wherein each said tooth-shaped section blocks said compressed air from exiting said air injection port for a second time interval when said tooth-shaped section passes in front of said air injection port as said discharge drum rotates;

wherein said first time interval is longer than said second time interval; and means for maintaining, in said conveying pipeline, a specific discharge pressure necessary for carrying said bar-like members to said receiving apparatus when the air supply is interrupted by said intermittent air supply means.

2. A pneumatic bar conveying apparatus according to claim 1, wherein said intermittent air supply means has a partition wall connected with the air supply side of said discharge drum, for shutting off the compressed air supplied from said air injection port to said holding groove; said partition wall being provided with a number of communicating holes equal to a number of said holding grooves, and having a same diameter as, or a smaller diameter than, a diameter of said bar-like members.

3. A pneumatic bar conveying apparatus according to claim 2, wherein said communicating holes are each aligned with a center of one of said holding grooves.

4. A pneumatic bar conveying equipment according to claim 3, wherein said intermittent air supply means comprises an intermittent operation valve which operates in synchronization with a rotational speed of said discharge drum and is disposed along a passage between a source of said air supply and said air injection port.

5. A pneumatic bar conveying apparatus according to claim 4, wherein said intermittent operation valve changes the rotational speed of said discharge drum in response to an electrical signal, and comprises an electromagnetic valve controlled according to said electrical signal.

6. A pneumatic bar conveying apparatus according to claim 1, further comprising means for securing said discharge pressure necessary for carrying a bar-like member to said receiving apparatus during the interruption of air supply by said intermittent air supply means, said securing means connecting said air injection port with an air supply source to thereby supply compressed air having said discharge pressure to said air injection port; and said air supply source adjustably providing a specific discharge pressure in said conveying pipeline for carrying said bar-like member to said receiving apparatus during the interruption of air supply by said intermittent supply means.

7. A pneumatic bar conveying apparatus according to claim 1, wherein a receiving roller is rotatably mounted beneath said holding section, to hold and orient bar-like members dispensed from said holding section, in grooves concavely formed in an outer periphery of said receiving roller, so that said bar-like members are successively delivered by constant-speed rotation of said receiving roller into said holding grooves of said discharge drum rotatably mounted beneath said receiving roller.

8. A pneumatic bar conveying apparatus according to claim 7, wherein said discharge drum rotates at a constant speed in a direction opposite to a direction of rotation of said receiving roller, thereby successively carrying said bar-like members from the inside of said holding groove to said force-feed position.

9. A pneumatic bar conveying apparatus according to claim 1, wherein said air injection port is open to communicate with said air supply source in a position corresponding to said force-feed position across said holding groove which has rotated at a constant speed to said force-feed position, and a cylinder head connected to said conveying pipe line, such that said air injection port, said cylinder head, and said conveying pipe line are aligned with said holding groove that has rotated at a constant speed to said force-feed position.

10. A pneumatic bar conveying apparatus according to claim 9, wherein an inner surface of one end of said cylinder head opposing said discharge drum is formed in a shape of a long hole which extends along the direction of rotation of said holding groove on said discharge drum, and having a gradually reduced diameter extending towards an other end with which the upstream end of said conveying pipeline is connected.

* * * * *